May 31, 1932.   C. A. COSTIGAN   1,860,705

PIE CRUST FORMING MACHINE

Filed April 6, 1931   2 Sheets-Sheet 1

INVENTOR.
Charles A. Costigan,
BY
ATTORNEYS.

May 31, 1932.  C. A. COSTIGAN  1,860,705

PIE CRUST FORMING MACHINE

Filed April 6, 1931   2 Sheets-Sheet 2

INVENTOR.
Charles A. Costigan,
BY
ATTORNEYS.

Patented May 31, 1932

1,860,705

UNITED STATES PATENT OFFICE

CHARLES A. COSTIGAN, OF LOS ANGELES, CALIFORNIA

PIE CRUST FORMING MACHINE

Application filed April 6, 1931. Serial No. 527,999.

This invention relates to and has for an object the provision of a machine for forming pie crusts from cakes of flat cross section into convex cross section, and for trimming the circular edges of the crusts subsequent to the baking of the cakes.

A machine of this character comprehends the forming and trimming of the pie crust cakes in rapid succession as they are removed from a baker, usually located adjacent the forming and trimming machine, together with power driven means for operating the forming and trimming elements at regularly timed intervals.

In the accompanying drawings I have shown a preferred form of my invention in which Fig. 1 is a plan view of a forming and trimming machine embodying my improvements shown operatively connected with a baker.

Figure 1:
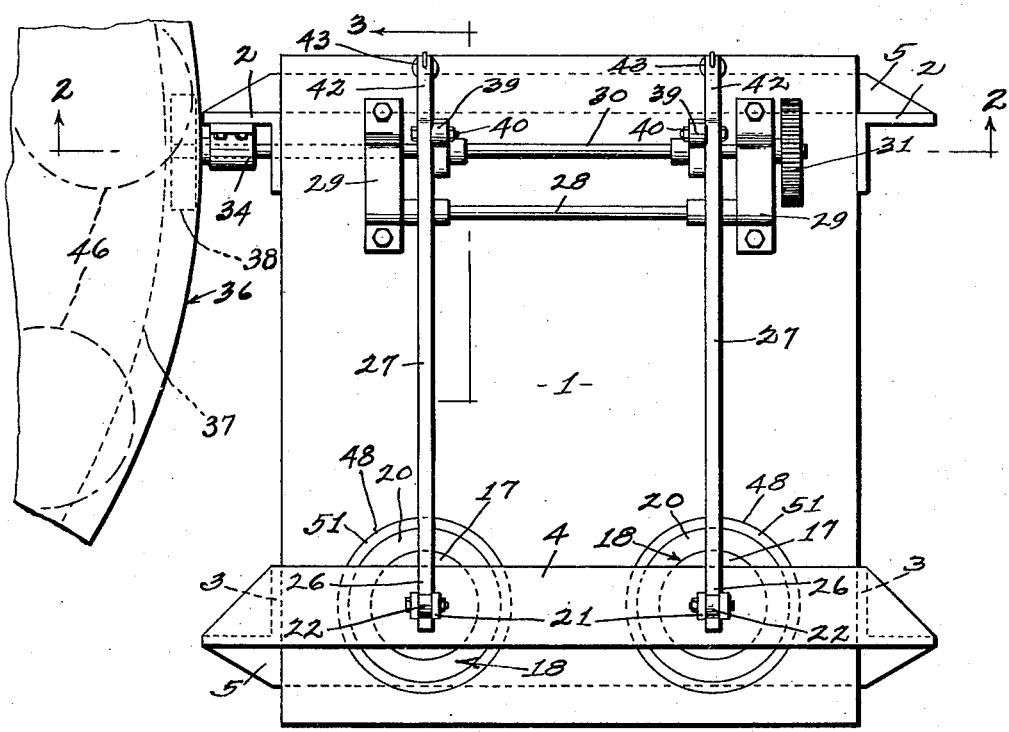

My mechanism includes a table 1 having a flat top with short legs 2, 2 at one end thereof and longer legs 3, 3 at its other end, which are extended upwardly above the table 1 and are cross connected by means of a bar 4. The legs 2 and 3 on each side of the table 1 may be cross connected by means of horizontal braces 5, 5 etc., as shown.

Each machine may include one or any number of forming and trimming devices operated from a common source of power, only two of such devices being shown in the drawings. Each of the forming units includes a plunger 6 which is slidable in the table 1 against the tension of a spring 7 which is coiled around the plunger and is compressed between the upper side of table 1 and suitable means such as a pin 8 carried in and projecting from the plunger 6.

The lower end of the plunger may carry suitable means such as a pin 9 for engagement with the lower side of table 1 for limiting the upward thrust of the plunger. Each plunger has a head 10 which, for convenience in manufacturing and assembling, may include a lower plate 11 and an upper plate 12 held on a reduced portion 13 of plunger 6 by means of a screw or screws 14, or otherwise. The plate 11 is circular and of flat cross section, while the plate 12 has a central flat portion paralleling the plate 11 and a beveled annular outer portion 15 with its periphery flush with the periphery of the plate 11, as shown in Fig. 3.

A plunger 16 is slidably mounted in the cross bar 4 above each of the plungers 6 and has a head 17 on its lower end to which is attached a forming plate 18 secured in place by means of a screw or screws 19 or otherwise. The plate 18 is similar in form to the plate 12 on plunger 6 and has a corresponding central flat portion with an annular outer beveled portion 20 corresponding in angularity to and of equal size with the portion 15 of plate 12 so that when the plate 18 is moved into contact with the plate 12 the plates will nest snugly together. The plate 18 is adapted to be held normally at the upper extremity of its movement, as shown in Fig. 3, with the head 17 of plunger 16 engaging the lower side of bar 4. Each of the plungers 16 has a clevis 21 secured to its upper end and a pair of rollers 22 and 23 are rotatably held in spaced relation in said clevis on pins 24 and 25 respectively. Said rollers are frictionally engaged by the free curved end portion 26 of a lever 27 in each case which is pivotally mounted at 28 on a bracket 29 attached to the top of table 1.

Figure 2:
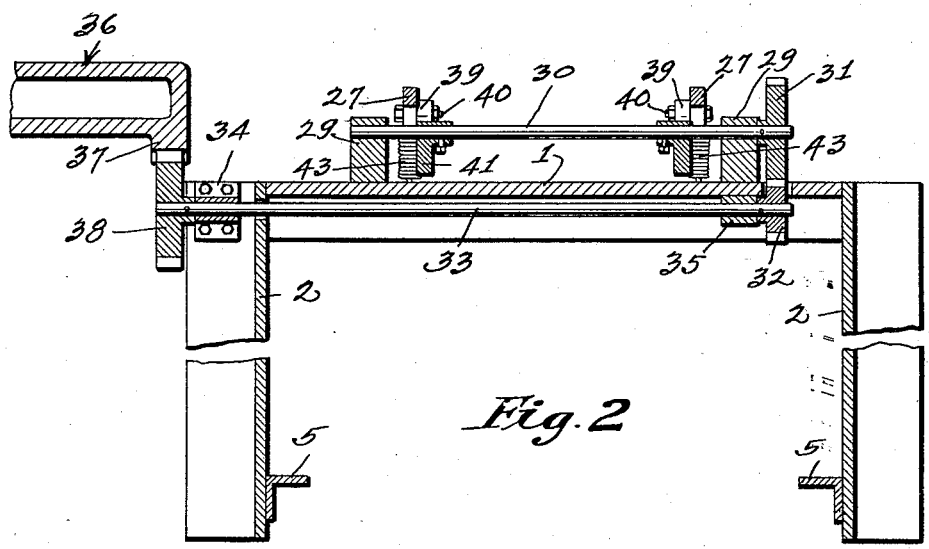
Fig. 2 is a sectional elevation of the same on line 2—2 of Fig. 1.

The brackets 29, 29 rotatably support a transverse shaft 30 on one end of which a gear 31 is fixed in position as shown in Fig. 2. Gear 31 meshes with and is driven by means of a pinion 32 carried on a transverse shaft 33 which is journaled in bearings 34 and 35 attached to or formed on the table 1, and power is communicated to the shaft 33 from a baker 36 which is rotatably mounted adjacent the table 1 and is provided with a large gear 37 on the lower side thereof meshing with and adapted to drive gear 38 carried on an end of shaft 33. Each of the levers 27 rotatably supports a follower roller 39 held on a bolt 40 and said rollers are adapted to engage, respectively, cams 41, 41 fixed to the shaft 30 adjacent the levers 27. The heels 42 of the levers 27 are connected by means of tension springs 43 with the table 1 and serve to hold the follower rollers 39 continuously engaged with the cams 41. Said springs 43 also serve to hold the upper forming plates 18 normally in the position as shown in Fig. 3.

Figure 3:
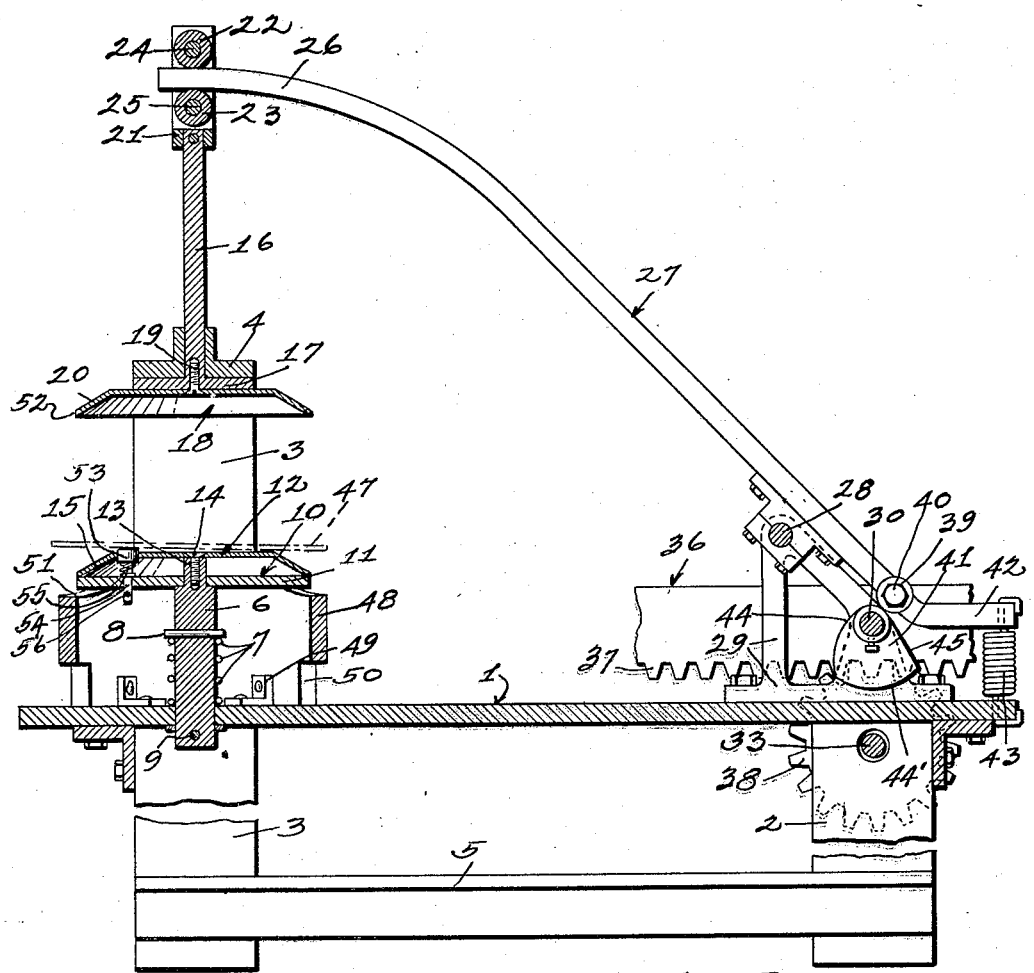
Fig. 3 is a sectional elevation of the same on line 3—3 of Fig. 1.
Figure 4:
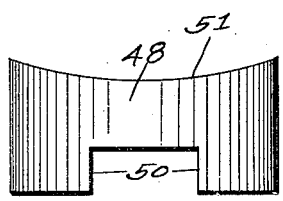
Fig. 4 is a side elevation of a trimming cylinder shown at right angles to the view of the same in Fig. 3.

The cams 41, when rotated in a clockwise direction, as seen in Fig. 3, will gradually elevate the heel portions of levers 27 and lower the portions 26 thereof as the plates 18 are moved into operative engagement with the plates 12.

It will be observed that the cams 41 are formed with approach faces 44 which gradually elevate the followers 39 to the dwells 44', and said dwells may be concentric with the shafts 30 so as to hold the plates 18 and 12 in forming position for a predetermined interval of time, at the completion of which interval the followers will drop from the dwells over straight portions 45, thus serving to quickly retract the plates 18 from forming position.

It will be understood that the baking element 36 is not a part of my invention, but is used adjacent to and in connection with my forming means for expediting the forming operations. The member 36 is rotatably mounted and is power driven and is provided with a plurality of hot plates or cookers, as at 46, on which the cakes 47, which are shown in broken lines in Fig. 3, are baked and browned to a desired extent prior to the forming operation.

An operator is positioned conveniently to the baker 36 and the table 1 so that as successive cooking elements 46 are moved into positions convenient to the reach of the operator the baked cakes 47 may be removed from the baker and deposited in the position shown in Fig. 3 on the forming plates 12.

Associated with each of the plungers 6 is a cylindrical cutting element 48 mounted concentrically with the axis of plunger 6 and attached to table 1 by means of a plurality of angle brackets 49. The cylinders 48 are provided with recesses 50 thru which suitable implements may be inserted for securing the cylinders in operative position, and the upper edges 51 of said cylinders are concave and cooperate with the peripheries 52 of the plates 18 for trimming the cakes 47 on the downward stroke of the plungers 16.

In this connection it will be noted that the plungers 6 are retractable downwardly against the tension of their springs 7 within the cylinders 48 subsequent to the engagement of the upper forming plates 18 with the cakes 47. The cams 41 are so arranged that they will not only depress the plates 18 into engagement with the cakes 47 for forming the cakes between the beveled portions 15 and 20 of plates 12 and 18, but additionally move the two plungers downwardly over the concave cutting edge 51 of cylinder 48 so as to trim the peripheries of the cakes 47 by a shearing action. The peripheries 52 of plates 18 necessarily fit the inner peripheries of cylinders 48 snugly enough to effect the trimming of the cakes.

The dough of which the cakes are made is provided with certain ingredients such as a suitable amount of sugar, which will lend flexibility to the cakes sufficient to permit the bending of the cakes in the forming operation. The forming members 12 and 18 are held in contact with the cakes for a sufficient length of time to insure retention of the forms occasioned by the members 12 and 18.

I may provide the lower forming plates 11 with one or more stripping devices, as shown in Fig. 3. Each of said devices has a head 53 which projects upwardly thru an aperture in the forming plate 12 and a stem 54 which is slidably held in the plate 11. A spring 55 is compressed between the head 53 and plate 11 for holding the head extended above the upper surface of the plate 12. The upward thrust of said head may be limited by suitable means, as for instance a pin 56 carried in the end of the stem 54 below plate 11. The purpose of these stripping devices is to separate the crusts from the forming plates at the end of a forming operation so that the crusts may be readily removed and will not adhere to the forming plates.

At the completion of each forming operation the cakes are removed and others are positioned between the forming members, as hereinbefore described, for successive operations.

It will be apparent that I have provided a simple, effective and economical means for forming and trimming pie crust cakes in the manner described, and it will be understood that the forming of the cakes 47 must necessarily be done while the cakes are hot in order to prevent the breaking of the cakes in the forming operation.

What I claim is:

1. A pie crust forming machine comprising a table, a rotatable shaft thereon, a yieldable forming member on said table, a power operated forming member alined with said yieldable member, a cam on said shaft, and means associated with and operable by said cam for moving said power operated member into operative relation with said yieldable member, and for further moving said forming members together, when a crust is held between said members, for forming the crust.

2. A pie crust forming machine as characterized in claim 1, including means for restoring said forming members to normally spaced positions at the completion of each forming operation.

3. A pie crust forming machine comprising a table, a rotatable shaft thereon, a cam on said shaft, a lever pivotally mounted on said table in engagement with said cam, a plunger connected with an end of said lever, a forming plate on said plunger, a second forming plate supported on the table in alinement with the first plate, whereby a pie crust of flat cross section may be positioned between said plates, means for yieldably supporting the second plate for movement with the first plate during a forming operation, said cam serving to move the first plate into operative relation with a crust and the second plate for molding the crust into desired form.

4. A pie crust forming machine comprising a supporting member, a pair of forming elements mounted thereon for receiving a pie crust therebetween, means for moving one of said forming elements into cooperative relation with the other forming element for forming the crust, means for permitting the yielding of said other forming element for movement with the movable forming element, and a tubular cutting member having a cutting edge cooperating with the periphery of said movable forming element for trimming the crust near the end of a forming operation.

5. A pie crust forming machine comprising a table, a pair of opposed forming plates axially alined and normally spaced apart on said table, for receiving a crust therebetween, one of said plates being power operated and the other plate being yieldable with the other plate when a crust is held therebetween, means for applying power to the power operated plate for operatively holding the plates in engagement with opposite sides of a crust in a forming operation, means for holding said plates so engaged for a sustained interval of time for molding the crust into a desired form, and means concentric with said plates and cooperating therewith to trim the periphery of the crust before the completion of the forming operation.

6. A pie crust forming machine comprising a table, a pair of axially alined plungers mounted thereon, forming plate of corresponding cross section on said plungers, means for yieldably supporting one of said forming plates in position to receive a crust preparatory to a forming operation, means for moving the other plate into cooperative relation with said yieldable plate and for further moving both of said plates and the crust therebetween together to complete a forming operation, and means associated with said plates and operative near the completion of a forming operation for trimming the periphery of the crust.

7. A pie crust forming machine comprising a table, a pair of forming members movably mounted thereon and axially alined for receiving crusts therebetween, means for moving one of said members into operative relation with the other member and for further moving said members together when a crust is held therebetween for molding the crust into desired form, and a cylindrical cutter cooperating with said forming members for trimming the edge of the formed crust as said members are moved together.

8. A pie crust forming machine comprising a table, a rotatable shaft thereon, a cam on said shaft, a lever pivotally mounted on said table in engagement with said cam, a plunger connected with an end of said lever, a forming plate on said plunger, a second forming plate supported on the table in alinement with the first plate, whereby a pie crust of flat cross section may be positioned between said plates, means for yieldably supporting the second plate for movement with the first plate during a forming operation, said cam serving to move the first plate into operative relation with a crust and the second plate for molding the crust into desired form, and a tubular cutter alined with said forming plates and supported on said table and provided with a cutting edge cooperating with the edge of said first mentioned plate, for trimming the edge of the crust during the forming operation.

9. A pie crust forming machine comprising a pair of axially alined plungers, means for yieldably supporting one of the plungers relative to the other, forming plates on said plungers, means for operating said plungers to compress a pie crust between said forming plates for molding the crust into desired form, and a stationary tubular cutter axially alined with and adapted to telescope said forming plates when the plates are moved in a forming operation for trimming the edge of the crust.

CHARLES A. COSTIGAN.